United States Patent [19]

Nardi

[11] 4,278,455
[45] Jul. 14, 1981

[54] AIR FILTER AND AIR FILTER CONTAINER

[75] Inventor: Giovanni Nardi, Pisa, Italy

[73] Assignee: Gilardini S.p.A., Turin, Italy

[21] Appl. No.: 97,679

[22] Filed: Nov. 27, 1979

[30] Foreign Application Priority Data

Nov. 30, 1978 [IT] Italy .............................. 53934/78[U]

[51] Int. Cl.³ ...................... B01D 50/00; B65D 51/16
[52] U.S. Cl. ........................................ 55/337; 55/323;
55/482; 55/492; 55/498; 55/502; 210/342;
210/444; 210/450; 210/451; 210/323.2;
220/287
[58] Field of Search ................. 55/323, 337, 482, 492,
55/497, 498, 502, 505, 507, 509; 210/323 T,
342, 444, 450, 451; 220/287

[56] References Cited

U.S. PATENT DOCUMENTS

| 3,672,130 | 6/1972 | Sullivan et al. | 55/323 |
| 3,745,753 | 7/1973 | Risse | 55/337 |
| 4,020,783 | 5/1977 | Anderson et al. | 55/337 |
| 4,135,899 | 1/1979 | Gauer | 55/482 |

Primary Examiner—David L. Lacey
Attorney, Agent, or Firm—Frost & Jacobs

[57] ABSTRACT

A container for air filters adapted to selectively house one or the other of at least two different primary filter elements having different diameters and different lengths, the container having a cylindrical body closed at one end by a fixed cap and closed at its opposite end by a removable cap, an air inlet in the container body and a centrally disposed air outlet in the fixed cap, the fixed cap being provided with a plurality of concentric annular sealing surfaces surrounding the air outlet, each such surface forming a seat for a different size primary filter element, centering means being provided to center each different primary filter element in the container, together with adjustable means for securing each different primary filter element in the container with its end in sealing contact with the corresponding sealing surface, provision being made for a secondary filter element.

12 Claims, 2 Drawing Figures

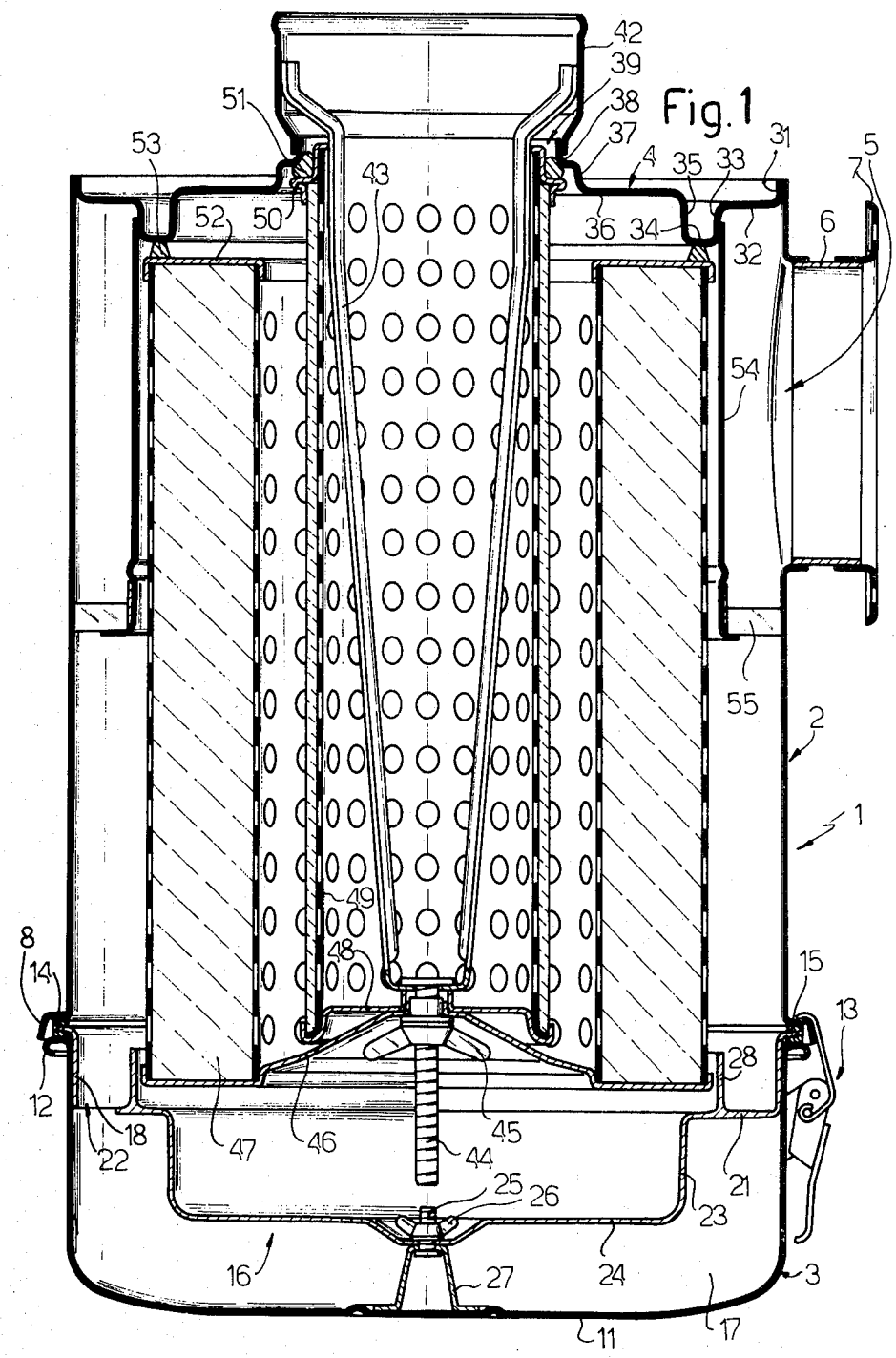

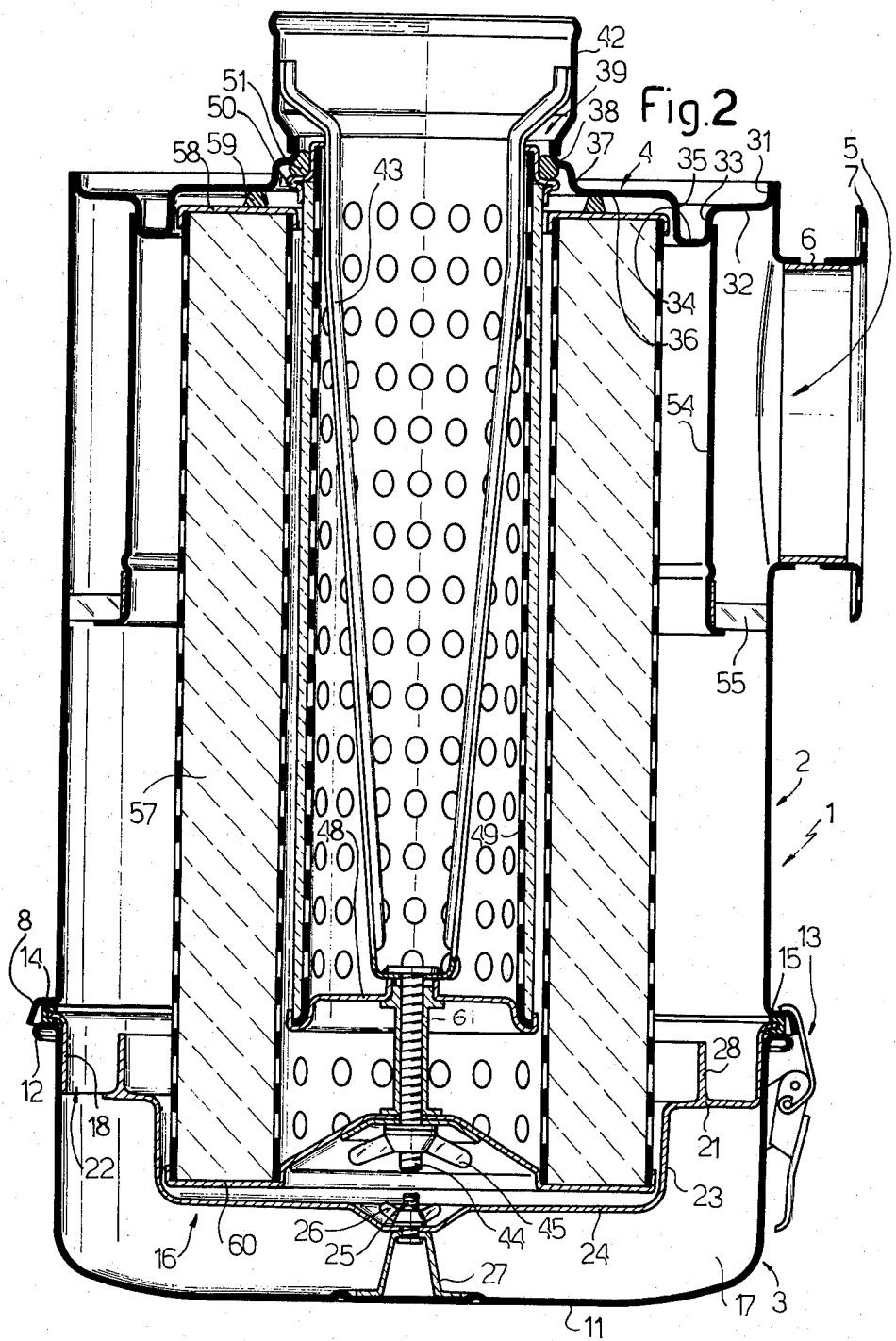

AIR FILTER AND AIR FILTER CONTAINER

BACKGROUND OF THE INVENTION

This invention relates to a container for air filters, preferably of the type used on industrial motor vehicles.

The construction of these containers is generally such that they are able to contain only one specific filter element. This has the drawback of having to use always the same specific filter element designed for that particular type of container whenever the filter element is replaced. This naturally restricts the use of the container, as it means that only one type of filter element can be utilized.

SUMMARY OF THE INVENTION

The object of the present invention is to provide a container for air filters which does not have the aforesaid drawback, i.e. which advantageously enables replacement filter elements of different types to be used.

The present invention therefore provides a container for air filters, comprising means to enable at least two alternative filter elements of different sizes to be housed, said means being able to provide a hermetic seal in different zones of said container, in respect of said filter elements of different sizes.

BRIEF DESCRIPTION OF THE DRAWINGS

The present invention will be more apparent from the detailed description given hereinafter of one embodiment by way of non-limiting example, with reference to the accompanying drawings in which:

FIGS. 1 and 2 are vertical sectional views of a container constructed in accordance with the present invention, and housing a first and second filter element of different types respectively.

DETAILED DESCRIPTION OF THE INVENTION

FIG. 1 shows a container constructed in accordance with the present invention, indicated overall by the reference numeral 1 and comprising a central part 2, a lower part 3 and an upper cap 4.

The central part 2 is cylindrical and comprises an air inlet opening 5, to which an inlet nozzle 7 is connected by way of a cylindrical portion 6. In its lower region, the central part 2 comprises an outwardly pointing annular rim 8. The lower part 3 is also cylindrical, and is closed at its lower end by a base 11, whereas at the top it comprises an outwardly pointing annular rim 12. The lower part 3 is connected to the central part 2 by snap fasteners 13 of known type, which compress an annular gasket 14 between the rims 8 and 12 of the parts 2 and 3, respectively, the gasket having a slot housing an outwardly pointing upper annular rim 15 of a shield 16, which defines a lower region 17 of the container in the lower part 3, in which the dust centrifuged from the air being filtered deposits. The shield 16 comprises an annular wall 18 substantially adjacent to the inner surface of the lower part 3, which terminates at its lower end in a flat wall 21 in the form of a circular band having an aperture 22. From the inner edge of the flat wall 21 there extends a lower vertical annular wall 23, which at its bottom forms a circular flat wall 24. The center of said flat wall 24 comprises a bore through which passes a threaded shank 25 on to which there is screwed a wing nut 26 for fixing the shield 16 to a U bracket 27 fixed to the inner central region of the base 11 of the lower part 3. An annular wall 28 projects upwards from the flat wall 21 to a height less than the height of the wall 18.

The upper cap 4 comprises an annular rim 31 which is fixed, for example by welding, to the upper annular rim of the central part 2. From the bottom of the annular rim 31 a flat wall 32 in the form of an annular band projects inwardly, from which, progressively towards the center of the cap 4, there is formed a vertical annular downward wall 33, an annular flat wall 34 disposed at a level lower than the wall 32, a vertical upward annular wall 35 of greater height than the annular wall 33, a flat wall 36 in the form of an annular band disposed at a greater height than the flat wall 32, an upward annular wall 37, and a terminal neck 38 substantially of L cross-section which defines an outlet opening 39 for the air from the container. To the outside of the terminal neck 38 there is fixed, for example by welding, an outlet nozzle 42 inside which there is fixed, for example by welding, a V-shaped clip 43 of known type, which at its bottom carries the head of a threaded shank 44 on which a wing nut 45 is screwed to lock the bottom of the element 43 to the lower disc 46 of a main filter element 47 of known type, the threaded shank and wing nut also serving to lock the lower disc 48 of a secondary filter element 49 also of known type. The secondary filter element 49, which is cylindrical, has an annular element 50 at its upper end which surrounds the clip 43 towards its upper end, and an annular gasket 51 which is compressed against the inside edge of the L-shaped terminal neck 38.

The main filter element 47, which is also cylindrical but of greater diameter than the secondary filter element 49, comprises an upper annular disc 52 and an annular gasket 53 which is compressed against the flat wall 34 of the upper cap 4, thus providing a hermetic seal. The outer lower region of the main filter element 47 is disposed adjacent to the inside of the annular wall 28 of the shield 16, so that any dust passage to the lower region of the filter element is prevented, and the bottom of the lower disc 46 is disposed at a greater height than the flat wall 21.

An annular wall 54 is fixed, for example by welding, to the annular wall 33, and besides forming a shield to prevent air entering through the opening 5 from directly striking the main filter element 47, also serves to center the upper region of the filter element 47 itself.

At its lower end the wall 54 also mounts an annular element 55 of known type with inclined fins, to give the entering air a vortex movement.

FIG. 2 shows the same container 1 as already described with reference to FIG. 1, but instead of housing the main filter element 47 it houses a main filter element 57, which is also of known type but of different dimensions. The filter element 57 is of smaller diameter and greater height than the filter element 47. It also comprises an upper annular disc 58 and an annular gasket 59, which is compressed against the flat wall 36 of the upper disc 4, and the outer lower region of the filter element 57 is adjacent to a vertical wall of the shield 16, represented by the annular wall 23, and has a lower disc 60 disposed at a slightly greater height than the flat wall 24. Between the lower disc 60 of the main filter element 57 and the lower disc 48 of the secondary filter element 49 there is disposed a spacer 61 around the threaded shank 44, so as to be able to use the same wing nut 45 for locking the two filter elements 57 and 49. The upper region of the filter element 57 is centred by the vertical wall 35, which internally houses the upper region of the element 57.

The container for air filters according to the present invention therefore has the advantage of being able to house at least two alternative main filter elements (47 and 57) of different dimensions. In this respect, irrespective of the height of the main filter element, a hermetic seal is always provided between the annular gasket 53 or 59 and the upper cap 4, in that said cap is constructed with various flat surfaces, in this case the flat walls 34 and 36. In addition, the shield 16 is also provided with different flat regions, i.e. the walls 21 and 24, to be able to contain the main filter elements of different heights, and also comprises annular walls of different diameters and heights, i.e. the walls 23 and 28 disposed adjacent to the outer annular terminal region of the main filter element. The upper region of the main filter element is always centered, namely by upper vertical annular walls with different diameters, i.e. in the present case the walls 35 and 54. Finally, the lower discs of the various main filter elements, i.e. the lower discs 46 and 60, can be locked at different heights on the threaded shank 14 by the wing nut 45.

The container according to the present invention can also house secondary filter elements 49 of different heights, obviously in comparison with the dimensions of the main filter element, it being possible for them to be housed inside the latter. In particular, in the example of FIG. 2, the secondary filter element 49 can be of greater length, with its lower disc 48 disposed in proximity to the lower disc 60, or disposed at a greater height and fixed on the threaded shank 44 by an additional wing nut.

Thus according to the present invention, by means of a single container it is very simple and practical to use main filter elements of different sizes.

Finally, it is apparent that modifications can be made to the described embodiment of the container according to the present invention, without departing from the scope of the inventive idea. For example, it can be designed so as to be able to house more than two alternative main filter elements. This can be easily attained by varying the configuration of the upper cap 4, in accordance with the dimensions of said different filter elements so that a hermetic seal is always obtained between the cap 4 and the upper annular gasket of said filter elements, when the upper region of the filter elements is centered. Again, the form of the screen can be correspondingly varied by being provided with a greater number of vertical annular walls adjacent to the lower region of the filter element.

In addition, in the example shown in FIGS. 1 and 2, the secondary filter element 49 can be locked with its own wing nut, other than the wing nut 45, this latter therefore locking only the disc 46 or 60.

Again, the secondary filter element 49 could be dispensed with, or instead of using a secondary filter element 49 of the described type, a secondary filter element of greater height could be used such that it becomes coupled to the main filter element 57 of FIG. 2, this secondary filter element not being used when the main filter element 47 is inserted into the container 1. Again, the wall 54 could be such as not to house the annular element 55, and in this case could be of a reduced height, its purpose then only being to center the upper region of the filter element 47.

What we claim is:

1. A container for air filters adapted to selectively house one of at least two different primary filter elements having different diameters and lengths, said container having a cylindrical body closed at one end by a fixed cap and at its opposite end by a removable cap, an air inlet in said container body and a centrally disposed air outlet in said fixed cap, said fixed cap having a plurality of concentric annular sealing surfaces surrounding said air outlet, each such sealing surface forming a seat for a different size primary filter element, an adjustable means for securing a selected one of the said primary elements in said container with its end in sealing contact with the corresponding sealing surface, each of said sealing surfaces being surrounded by an annular wall to center the selected filter element on its corresponding sealing surface, and including centering means within the container at the end opposite said fixed cap to center the selected filter element with respect to its corresponding sealing surface, said centering means comprising a plurality of annular walls corresponding in diameter to the diameters of said different primary filter elements, each of said annular walls of said centering means being in axial alignment with a corresponding annular wall surrounding said sealing surfaces, whereby to center the selected filter element both at the top and at the bottom of said container.

2. The container claimed in claim 1, wherein said sealing surfaces are at different heights.

3. The container claimed in claim 2, wherein said annular walls surrounding said sealing surfaces have different heights.

4. The container claimed in claim 1, wherein said annular walls of said centering means are at different heights.

5. The container claimed in claim 4, wherein the areas between said annular wall surfaces of said centering means are closed by flat wall surfaces which define said centering means and said container includes a screen which is positioned to define a dust collecting region lying between said shield and the removable cap, one of said flat wall surfaces having an opening therein in communication with the dust collecting region.

6. The container claimed in claim 5 wherein said centering means is mounted on said removable cap.

7. The container claimed in claim 1 including means for concentrically mounting a secondary filtering element within the selected primary filtering element.

8. The container claimed in claim 7, wherein the means for mounting said secondary filter element comprises an annular neck surrounding said air outlet.

9. The container claimed in claim 1, wherein said adjustable means comprises a threaded shank upon which the primary filter elements can be fixed at different heights depending upon their lengths.

10. The container claimed in claim 1 in combination with a primary filter element of a size to seat on one of said annular sealing surfaces, said primary filter element having an annular gasket in contact with said one of said sealing surfaces, whereby said primary filter is hermetically sealed to said one sealing surface.

11. The combination of claim 10, wherein the outermost of said annular walls surrounding said sealing surfaces lies in spaced relation to the body of the container and comprises a shield positioned and arranged to intercept the air entering the container through said air inlet, said air inlet being connected to a lateral portion of said container body.

12. The combination claimed in claim 11, wherein said outermost annular wall perimetrally is mounted to said body of said container adjacent said inlet by an annular element having a plurality of inclined fins positioned to induce vortex movement of air entering the container through said air inlet.

* * * * *